United States Patent
Soroushian

(10) Patent No.: US 12,088,892 B1
(45) Date of Patent: Sep. 10, 2024

(54) SYSTEM AND METHOD FOR MONITORING HLS STREAMS AND TRACKING SCTE-35 MARKERS

(71) Applicant: Kourosh Soroushian, San Diego, CA (US)

(72) Inventor: Kourosh Soroushian, San Diego, CA (US)

(*) Notice: Subject to any disclaimer, the term of this patent is extended or adjusted under 35 U.S.C. 154(b) by 0 days.

(21) Appl. No.: 18/205,565

(22) Filed: Jun. 5, 2023

(51) Int. Cl.
| H04N 21/81 | (2011.01) |
| H04N 21/231 | (2011.01) |
| H04N 21/24 | (2011.01) |
| H04N 21/845 | (2011.01) |

(52) U.S. Cl.
CPC ..... *H04N 21/812* (2013.01); *H04N 21/23106* (2013.01); *H04N 21/2407* (2013.01); *H04N 21/8455* (2013.01)

(58) Field of Classification Search
CPC .................................................. H04N 21/812
See application file for complete search history.

(56) References Cited

U.S. PATENT DOCUMENTS

2015/0106841 A1* 4/2015 Wolf .................... H04N 21/812
725/32

* cited by examiner

*Primary Examiner* — Michael H Hong

(57) ABSTRACT

The invention provides a system and method for monitoring adaptive streaming media, including but not limited to HTTP Live Streaming (HLS) and Dynamic Adaptive Streaming over HTTP (MPEG-DASH), and tracking SCTE-35 markers. The system parses a media playlist, identifies cue-in and cue-out markers, computes and compares the measured and expected durations of ad blocks, generates alerts for mismatches, and communicates findings. This system is capable of accurately determining the cue-in and cue-out times of advertisements in media streams. The invention enhances the accuracy of ad placement, ensuring robustness, adaptability, and effectiveness of advertising campaigns in streaming media.

20 Claims, 3 Drawing Sheets

SYSTEM AND METHOD FOR MONITORING HLS STREAMS AND TRACKING SCTE-35 MARKERS

FIELD OF THE INVENTION

Figure 1:
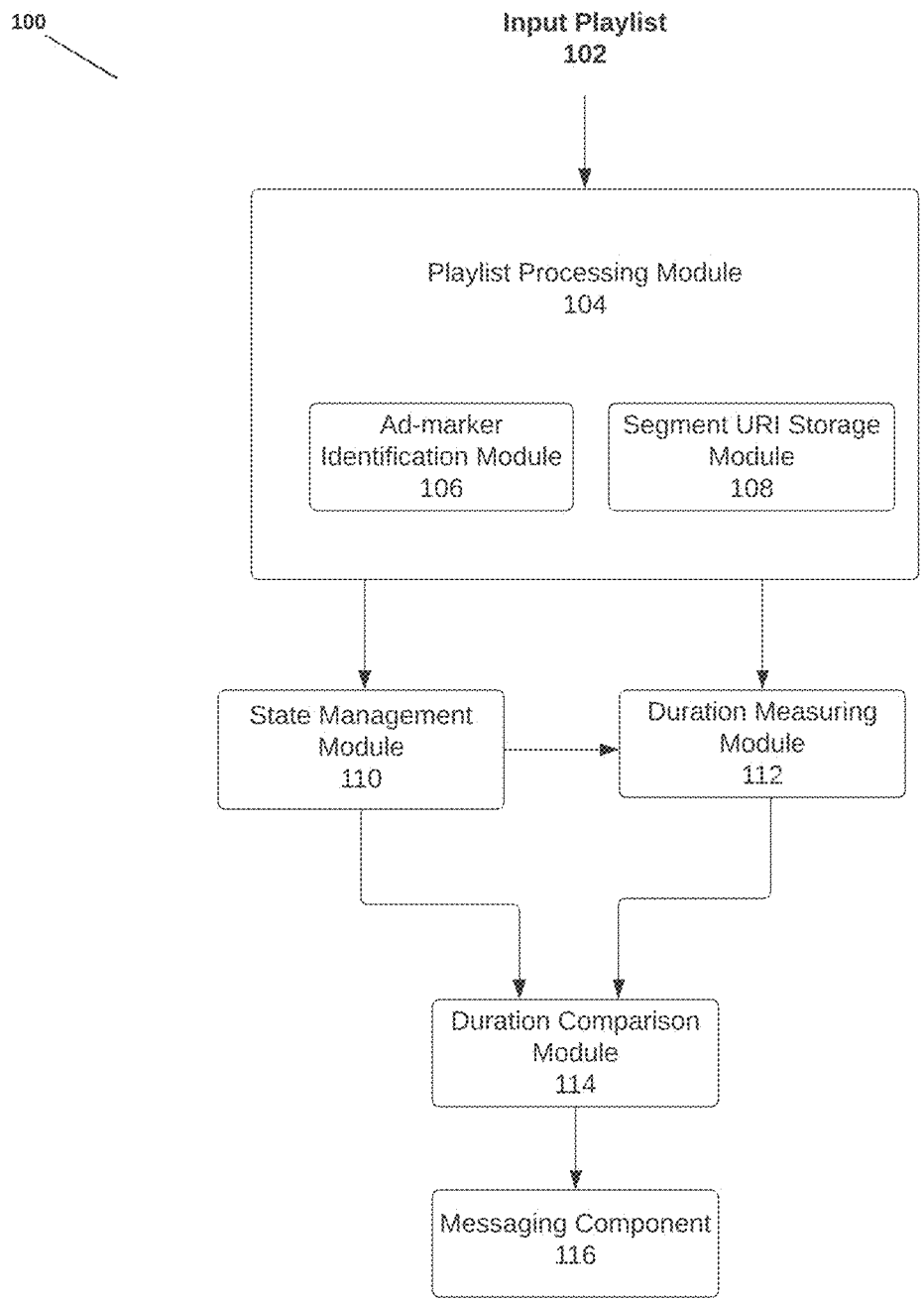

The present invention relates to the field of video streaming and, more particularly, to a method and system for managing and comparing advertisement durations within HLS and MPEG-DASH video streams to ensure compliance with advertising agreements and improve user experience.

BACKGROUND OF THE INVENTION

Video streaming platforms rely on advertisements to generate revenue. These platforms typically have agreements with advertisers, specifying the duration of the ads to be shown during video playback.

SCTE-35 is a standard developed by the Society of Cable Telecommunications Engineers that is commonly used in the broadcasting industry. This standard defines cues or markers that are inserted into the transport stream of a program, indicating the start and end points of network commercial insertion opportunities. In the context of video streaming, these SCTE-35 markers play a crucial role in ensuring that ads are correctly inserted during video playback. However, due to various factors such as stream instability or irregularities, the actual duration of the ads delivered may not always align with the planned duration signaled by the SCTE-35 markers. This mismatch can create complications with advertisers and disrupt the viewing experience for users.

In the realm of media streaming, accurately identifying and managing advertisement segments within a stream is crucial for ensuring a seamless viewer experience and maximizing the effectiveness of advertising campaigns. A prevalent method for marking these advertisement segments in the stream involves the use of cue-in and cue-out markers.

Cue-out and cue-in markers are special types of metadata embedded within a media stream that denote the beginning and end of an advertisement break, respectively. They are usually part of a standardized signaling framework like SCTE-35, used widely in digital video systems for signaling ad insertions, content replacement, or program boundary.

The cue-out marker typically signals the start of an advertisement period in the stream. When a playback system encounters a cue-out marker during a stream, it understands that the subsequent content until the cue-in marker is meant to be an advertisement or a series of advertisements. This content could be locally stored ads that replace the original content during this period or separate streams carrying the ads themselves.

The advertisement period continues until a cue-in marker is encountered in the stream. The cue-in marker indicates the end of the advertisement period and the resumption of the original programming content. These markers ensure that the original content is resumed precisely at the point it was paused for the ad break, offering viewers a smooth and uninterrupted watching experience.

By utilizing cue-out and cue-in markers, streaming services can dynamically insert advertisements into their content, tailoring the advertising experience based on various factors such as viewer preferences, location, or the specific content being watched. This allows for a more personalized, relevant, and thus effective advertising approach.

In addition to being embedded in the media stream, SCTE-35 markers can also be directly integrated into media playlists, such as those used by HTTP Live Streaming (HLS) or Dynamic Adaptive Streaming over HTTP (MPEG-DASH). These playlists act as a roadmap for the streaming service, guiding the playback sequence of media files and advertisement segments.

Within the context of HLS or MPEG-DASH, the playlist is a text file that lists the sequence of media segments for the player to load and play. When SCTE-35 markers are incorporated into these playlists, they provide additional, precise points of reference for ad insertion, beneficial in instances where media segments within the playlist may be subject to changes or re-sequencing.

Upon encountering an SCTE-35 marker within the playlist, the player treats it as a signal to insert an advertisement at the indicated point. Depending on the type of SCTE-35 marker present in the playlist, this could represent the start (cue-out) or end (cue-in) of an advertisement segment.

Furthermore, the inclusion of SCTE-35 markers within the playlist provides an extra layer of assurance for accurate ad delivery. If the SCTE-35 markers embedded in the media stream are compromised due to stream instability or irregularities, the SCTE-35 markers in the playlist act as a fallback, ensuring the planned ad insertions proceed as intended.

The markers within playlists also provide expanded opportunities for ad tracking and management. From verifying ad durations and ensuring compliance with regulatory guidelines, to enabling more personalized advertising experiences, SCTE-35 markers in playlists fortify the robustness and flexibility of ad insertion in video streaming, enhancing both the viewing experience and the efficacy of advertising campaigns.

These markers also play a crucial role in tracking and managing advertisement durations. By measuring the time between cue-out and cue-in markers, streaming services can verify the actual duration of advertisements against planned durations, ensuring accuracy and adherence to ad duration guidelines or regulations.

Some potential use-cases of this system may be the following:

Broadcast Monitoring: In a live streaming event such as a sports game, broadcasters may need to insert commercials or promotional content at specific points. The system can be used to monitor the live stream for SCTE-35 cue-in and cue-out markers, ensuring the timely and accurate insertion and removal of advertisements. In the case of mismatches between the expected and measured duration of the advertisement block, the system can alert the broadcasters in real time, enabling immediate remediation and ensuring a smooth viewer experience.

Quality Assurance: Streaming service providers often require quality assurance mechanisms to ensure that their service is delivered flawlessly. Our system can be used to regularly monitor the media playlists, tracking SCTE-35 markers and identifying any discrepancies or errors. For example, if an advertisement is shorter or longer than anticipated, the system can trigger an alert, helping to prevent potential interruptions or abrupt transitions in the stream.

Ad Verification: Advertisers often require confirmation that their ads were delivered as intended. Using the system, streaming service providers can verify that each ad was streamed for the correct duration and at the right time, providing an additional level of transparency and accountability. The system's communication module could generate a report detailing the cue-in and cue-out times, and any detected discrepancies, and send it to advertisers or an ad verification agency.

Regulatory Compliance: In certain jurisdictions, there are strict regulations on the length and frequency of advertisements in video streams. The system can aid in maintaining compliance with such regulations by continuously monitoring the stream and alerting if the duration of advertisements exceeds the permissible limits.

Personalized Advertising: In cases where the streaming service is delivering personalized ads to individual viewers, the system can track SCTE-35 markers for each viewer's stream. If any anomalies are detected in the ad delivery, such as a viewer receiving the same ad multiple times in quick succession, the system can alert the streaming service to investigate the issue.

SUMMARY OF THE INVENTION

The present invention relates to systems and methods for monitoring adaptive streaming media and tracking SCTE-35 markers, even as new versions or specifications of the SCTE-35 standard emerge. The system and method facilitate efficient and accurate determination of cue-in and cue-out times and management of ad durations in adaptive streaming media, even in cases where the same segment Uniform Resource Identifier (URI) is used for multiple cue-out points and no new cue-in markers have been detected since the last detected cue-out marker within the same segment.

In one aspect, the system comprises several modules: a parsing module, a marker identification module, a duration computation module, an alert generation module, a communication module, a segment manager, a state management module, and optionally an error detection module. The parsing module is configured to parse a media playlist to extract segment information, including segment duration, URI, cue-in and cue-out markers, and date ranges. It can process M3U8 files for HLS playlists or MPD files for MPEG-DASH playlists and is extensible to support additional streaming formats.

The marker identification module identifies cue-in and cue-out markers based on the presence of SCTE-35 data in the segment information and is capable of handling new versions or specifications of the SCTE-35 standard. The duration computation module computes the measured duration between cue-in and cue-out markers by summing the durations of the segments identified by the URIs between the markers. This module also compares the measured duration with the expected duration to identify potential mismatches, which may indicate issues in the stream or with the SCTE-35 markers.

The alert generation module generates alerts or reports if a mismatch is detected. The communication module transmits messages detailing the detected cue-in and cue-out markers, the measured duration of the advertisement block, or any identified discrepancies or errors to an external generic messaging system. It communicates with other systems or users using a technology-agnostic messaging system capable of interoperating with different messaging protocols.

The segment manager maintains a list of SCTE-35 segment URIs, provides the segment URI information to other components of the system, manages memory and resources, and employs a caching system to optimize the system's memory usage and performance. The state management module is designed to reset the advertisement duration measurement when the same segment URI is used for multiple cue-out points, and no new cue-in markers have been detected since the last detected cue-out marker within the same segment. Optionally, the system could incorporate an error detection module to detect errors in the HLS or MPEG-DASH stream or SCTE-35 markers and generate error messages.

The method implemented by the system comprises several steps that parallel the operations of the system's modules, including receiving and parsing a media playlist, identifying and storing SCTE-35 markers, maintaining a list of SCTE-35 segment URIs, initiating the measurement of an advertisement block duration, comparing the measured duration with the expected duration, and transmitting messages to an external generic messaging system. It also includes steps to reset the advertisement duration measurement in certain conditions, to detect and alert errors in the HLS or MPEG-DASH stream or SCTE-35 markers, and to employ a caching mechanism to optimize resource usage.

This invention provides a versatile and adaptable means of monitoring adaptive streaming media and tracking SCTE-35 markers, contributing to the efficiency and accuracy of ad duration management in such media. It also effectively handles evolving SCTE-35 standards and complex segment URI situations, thus offering significant advantages over existing solutions.

DETAILED DESCRIPTION OF THE INVENTION

In the following detailed description, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

Before proceeding to the detailed description of the embodiments, it may be beneficial to provide a brief overview of the HTTP Live Streaming (HLS) and the MPEG-DASH streaming protocols, to which the invention may be applied.

HTTP Live Streaming (HLS) is a streaming protocol developed by Apple for delivering audio and video content over the internet. It works by breaking the overall stream into a sequence of small HTTP-based file downloads, each downloading one short chunk of an overall potentially unbounded transport stream. As the stream is played, the client may select from a number of different alternate streams containing the same material encoded at a variety of data rates, allowing the streaming session to adapt to the available data rate. At the start of the streaming session, it downloads an extended M3U playlist containing the metadata for the various sub-streams which are available.

On the other hand, MPEG-DASH (Dynamic Adaptive Streaming over HTTP) is an international standard for streaming multimedia over the internet. It is the first adaptive bit-rate HTTP-based streaming solution that is an open standard. Similar to HLS, DASH works by breaking the content into a sequence of small HTTP-based file segments, each segment containing a short interval of playback time of content that may be many hours in duration, such as a movie or the live broadcast of a sports event. The content is made available at a variety of different bit rates, i.e., alternative segments encoded at different bit rates covering aligned short intervals of playback time are made available. As the content is played back by an MPEG-DASH client, the client automatically selects from the alternatives the next segment to download and play back based on current network conditions.

Both HLS and MPEG-DASH are important protocols in the streaming media domain, and the following description of the ad-duration management system is applicable to both. The system is designed in a way that it is compatible with the playlist structure of both protocols, making it versatile and adaptable to different streaming environments.

Moving to the description of the system itself, FIG. 1 shows a block diagram of an embodiment of an ad-duration management system 100. The system includes a playlist processing module 104, an ad-marker identification module 106, a segment URI storage module 108, a state management module 110, a duration measuring module 112, a duration comparison module 114, and a messaging component 116.

The playlist processing module 104 receives the input playlist 102, which may represent VOD or live content, and processes the playlist information from the data stream. The input data stream may be in any suitable format, such as an M3U8 playlist file for HLS, MPD file for MPEG-DASH, and even extending to other media file formats as needed, demonstrating the system's adaptability. The playlist processing module 104 identifies segments with advertisement markers such as SCTE-35 markers using the ad-marker identification module 106 and extracts the relevant information for each segment, including the segment duration and the presence of cue-in and cue-out markers.

The playlist processing module 104 also utilizes the segment URI storage module 108 to store the processed segment URIs and their associated information, such as segment duration and other relevant data such the SCTE-35 markers encapsulated as binary-coded Base64 Strings. When consecutive playlists are processed, the segment URI storage module 108 is used to determine whether a new segment has been added to the playlist or not. In order to efficiently manage memory and resources, the segment URI storage module 108 uses a mechanism to maintain information within a data structure, such as a fixed-length array. As data samples are added to the data structure, other data samples may be automatically removed in order to ensure the total size of the data structure does not continuously increase. This mechanism ensures that the length of the data structure is kept consistent with the length of the most recent media playlist. To achieve this, the system calculates the difference between the current length of the data structure and the length of the most recent media playlist. If the data structure entry count is larger than the most recent playlist segment count, the system removes the excess data elements from the beginning of the data structure, which correspond to the oldest segments.

In general, the ad-marker identification module 106 is capable of processing various streaming playlist formats including M3U8 files for HLS (HTTP Live Streaming) playlists and MPD (Media Presentation Description) files for MPEG-DASH (Dynamic Adaptive Streaming over HTTP) playlists. For HLS playlists, the ad-marker identification module 106 scans through the M3U8 file, focusing on the "#EXTINF" tags that specify segment duration, and the "#EXT-X-CUE-OUT" and "#EXT-X-CUE-IN" tags that indicate SCTE-35 markers. The Uniform Resource Identifier (URI) following each "#EXTINF" tag is also extracted for further use in the system. For MPEG-DASH playlists, the ad-marker identification module 106 reads the MPD file and retrieves the segment duration and URI from each "SegmentTimeline" and "SegmentURL" respectively. As MPEG-DASH does not inherently support SCTE-35 markers, these are typically inserted as EventStream events. The ad-marker identification module 106 is configured to also parse these events for SCTE-35 data.

More specifically, the ad-marker identification module 106 identifies the cue-in and cue-out markers in the playlist being processed by the playlist processing module 104. These markers may be included in the playlist in any number of formats. For example, the cue-out marker may be identified in an HLS playlist by a variety of descriptors such as "#EXT-X-CUE-OUT:DURATION=120", "#EXT-X-CUE-OUT:120", "#EXT-X-CUE-OUT", or a marker starting with "#EXT-X-DATERANGE" and containing the keyword "SCTE35-OUT=". Likewise, the cue-in marker may be identified in a playlist by a variety of descriptors. For example, the following descriptors may be used to represent the cue-in maker in an HLS playlist: "#EXT-X-CUE-IN", or a marker starting with "#EXT-X-DATERANGE" and containing the keyword "SCTE35-IN=". These markers only represent a subset of the totality of all potential makers which can be used to signal a cue-out and cue-in event in the input playlist 102.

For MPEG-DASH playlists, the ad-marker identification module 106 reads the MPD file and retrieves the segment duration and URI from each "SegmentTimeline" and "SegmentURL" respectively. As MPEG-DASH does not inherently support SCTE-35 markers, these are typically inserted as EventStream events within the MPEG-DASH manifest file. EventStreams provide a way to include timed metadata, like SCTE-35 markers, within the manifest file that synchronizes with the media presentation. The ad-marker identification module 106 is configured to parse these EventStream events for SCTE-35 data.

The system is also extensible to support additional streaming formats. New parsing rules can be added to the ad-marker identification module 106 to accommodate different playlist structures and tag conventions, allowing the system to stay versatile and adaptable to evolving streaming technologies.

The duration measuring module 112 measures the duration of advertisement segments identified by the playlist processing module 104. The duration measuring module 112 accumulates the durations of consecutive advertisement segments based on the state of the ad-duration management system.

The state management module 110 maintains a variety of states and parameters for the ad-duration management module 100, which may remain persistent when successive playlists are analyzed by the system. One such state may be "state.scteCueOut", which may be used to determine whether the system is tracking the duration for an advertisement period. Another parameter may be "state.scteMeasuredDuration", which may be initialized to zero at the start of an advertisement-block and used to accumulate the duration of segments belonging to an advertisement block between the cue-out and cue-in markers. A "state.scteCueOutURI" parameter may be used to identify the segment URI associated with the last occurrence of the cue-out marker, and a corresponding "state.scteCueInURI" parameter may be used to identify the URI of the particular segment associated with the last cue-in marker observation. A "state.scteStartTime" parameter may be used to store the starting time of the advertisement block. The "state.scteCue- OutURI" and "state.scteCueInURI" parameters may be particularly useful for detecting the occurrence of multiple advertisement blocks in a single playlist.

Using the previously-defined states and parameters, the state management module 110 can initiate tracking of new advertisement intervals or blocks between cue-out and cue-in markers. Specifically, the start of an advertisement block is denoted by the presence of a cue-out marker, as determined by the ad-marker identification module 106. When the state management module 110 detects a cue-out marker while the system is not already in the advertisement-period measurement state (state.scteCueOut is False), and the current segment URI is distinct from the previous segment URI where a cue-out marker was identified (state.scteCueOutUri !=uri), it signals the commencement of an advertisement block. At this juncture, the state management module 110 registers the start time for this advertisement block (state.scteStartTime is updated), and the system transitions into the advertisement-period measurement state (state.scteCueOut is set to True).

In contrast, the conclusion of an advertisement block is denoted by the appearance of a cue-in marker. When the state management module 110 identifies a cue-in marker via the ad-marker identification module 106 while the system is in the advertisement-period measurement state (state.scteCueOut is True), and the current segment URI is different from the previous segment URI where a cue-in marker was seen (state.scteCueInUri !=uri), it signifies the end of the advertisement block. At this point, the system transitions out of the advertisement-period measurement state, concluding the tracking of the advertisement block duration, and the duration comparison module 114 compares the measured advertisement duration obtained by the duration measuring module 112 with an expected advertisement duration which is provided by the state management module 110. The expected advertisement duration may be provided as part of the input data stream 102, for example, as an attribute in the SCTE-35 cue-out marker. If a mismatch between the measured advertisement duration and the expected advertisement duration is detected, and the system has been configured to generate alerts or reports, the duration comparison module 114 communicates with a messaging module 116 to create an alert or report which may be sent to other systems or users for further processing or analysis. The duration comparison module 114 may also be configured to only generate alerts if discrepancies between the measured advertisement duration and the expected advertisement duration exceed a user-specified or predetermined threshold.

In certain scenarios, the playlist processing module 104 may encounter overlapping or irregular segments. In such cases, the duration measuring module 112 is designed to effectively handle these irregularities. Specifically, the duration measuring module 112 can keep track of overlapping segments and adjust the duration measurements accordingly to ensure accurate duration tracking.

In other scenarios, the state management module 110 may encounter a condition where the same segment URI is used when consecutive cue-out markers are detected. Since the state management module 110 uses the "state.scteCueOutURI" parameter to identify the segment URI associated with the last occurrence of the cue-out marker and this state is also used to determine whether a new advertisement-block has occurred, the "state.scteCueOutURI" may need to be reset in order to allow the next advertisement-block with a cue-out marker which utilizes the same segment URI to be recognized. To achieve this, the "state.scteCueOutURI" parameter may be cleared after the appearance of the cue-in marker signaling the close of the advertisement block, and when the cue-out maker is no longer part of the media playlist.

Let us consider a few specific scenarios which demonstrate the flexibility and robustness of the ad-duration management system under different conditions.

Scenario 1—Regular Ad Insertion: In a typical operating environment, the system handles an HLS or MPEG-DASH stream with well-defined SCTE-35 markers indicating the start and end of the ad breaks. Upon receiving the stream, the playlist processing module 104 identifies the markers and extracts the segment information. Subsequently, the duration measuring module 112 computes the cumulative duration of the ad break by summing up the durations of individual segments. This measured duration is then communicated to the messaging component 116, which sends out a confirmation of successful ad delivery to a generic messaging system.

Scenario 2—Overlapping SCTE-35 Markers: The system also capably handles complex situations such as when the playlist features overlapping SCTE-35 markers. Such an overlap could occur due to incorrect insertion of ad markers or due to irregularities in the stream. In these instances, the state management module 110 and duration measuring module 112 identify the overlap, reset the duration measurement, and accurately calculate the duration of each ad break. The messaging component 116 then sends out an alert about the overlap and the corrective actions taken.

Scenario 3—Absence of SCTE-35 Markers: In situations where the playlist lacks SCTE-35 markers due to an error, the state management module 110 identifies this discrepancy in expected SCTE-35 markers. The messaging component 116 sends out an alert about the missing SCTE-35 markers. The system continues to monitor the stream and sends out another alert once the SCTE-35 markers reappear in the playlist.

Scenario 4—Error in Stream: The system is resilient even in the face of disruptions in the stream. If an error occurs in the stream, the system's error detection step identifies the error. Subsequently, the messaging component 116 sends out an alert about the detected error. The system continues to monitor the stream and sends out a message when the stream returns to normal.

These scenarios illustrate the ad-duration management system's ability to handle a variety of situations, showcasing its robustness and adaptability. Such versatility is beneficial in real-world streaming environments that often deal with diverse and unpredictable conditions.

Once the core components of the ad-duration management system have been defined and their functions elucidated, it becomes necessary to explain how this system communicates with other external systems. The messaging component 116 has been designed for seamless integration with a multitude of external systems for improved functionality and timely information dissemination.

The external systems, termed here as "generic messaging systems", can include but are not limited to email servers, SMS gateways, web push notification services, or instant messaging platforms. The messaging component can format the messages it generates to be compatible with these systems, thereby enabling real-time communication about the status of ad durations and any detected issues.

Each of these systems offers a unique interface for communication. For instance, in the case of an email server, the messaging component can automatically generate an email with relevant information upon the detection of an issue.

This email could be dispatched to a predefined list of recipients, alerting them about the situation.

Similarly, if the system is interfacing with a web-based dashboard or monitoring system, the messaging component could send messages to update the dashboard in real-time, offering a visual and interactive representation of the ad durations' status.

The messaging component is also capable of tailoring its messages according to the requirements of the interfaced system. This could involve structuring the message as a JSON object for web-based systems, an XML document for certain data processing systems, or a simple text format for SMS or similar platforms.

In addition, the messaging component is designed to handle responses or acknowledgements from the interfaced systems. For example, in cases where a confirmation of receipt from the interfaced system is not received, it could be programmed to resend a message, thereby ensuring reliable communication.

The interfacing functionality provides an efficient and effective means for our ad-duration management system to integrate into a broader media streaming and advertising ecosystem. This design assists in conveying crucial information to the right systems at the right times and significantly contributes to the overall efficiency and accuracy of ad duration management.

Figure 2:
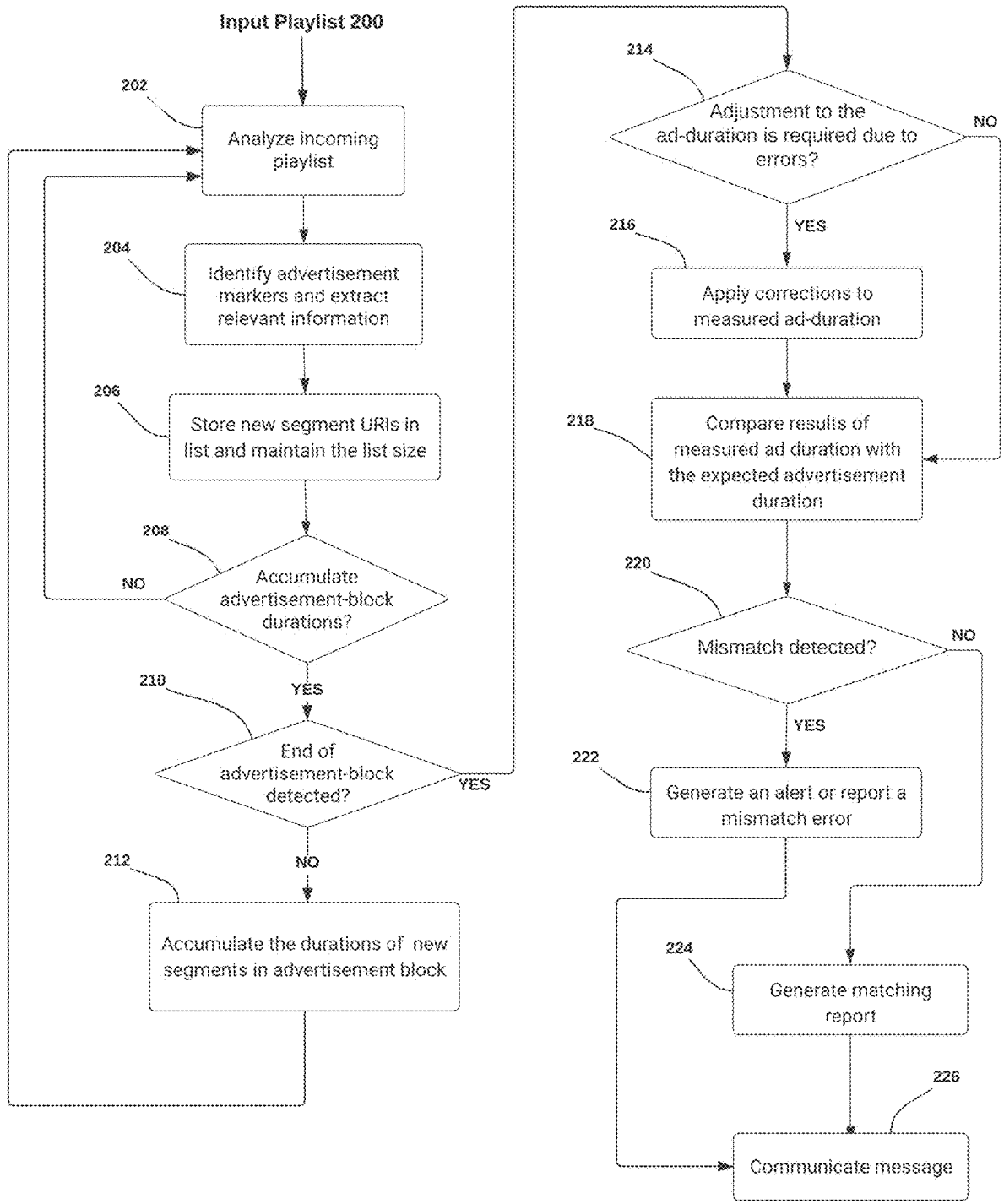

FIG. 2 shows a flowchart illustrating an embodiment of a method for ad-duration management using the ad-duration management system 100. At step 202, the playlist processing module 104 receives the input playlist 200 and analyzes the incoming playlist information. At step 204, the ad-marker identification module 106 identifies playlists containing advertisement markers and extracts relevant information for each segment, such as the segment URI and segment duration, and the type of advertisement marker.

At step 206, the segment URI storage module 108 stores the processed segment URIs and their associated information in a data structure and also limits its overall size. At step 208, a decision is made by the state management module 110 to determine whether a new advertisement measurement period has started or the system is already in an advertisement measurement state, as indicated by the "state.scteCueOut" state variable. If no measurement of the advertisement-block is required, the system transitions back to analyzing the next playlist 202.

At step 210, a decision is made by the state management module 110 to determine whether the current advertisement measurement period has ended, as indicated by the "state.scteCueIn" state variable. If the advertisement measurement period has not ended, the duration measuring module 112 will accumulate the durations of any new segments in the playlist which occur after the cue-out marker and before the cue-in marker for the advertisement block. The advertisement-block duration may be set to zero when the "state.scteCueOut" state transitions from False to True, or at the beginning of an advertisement block. Alternatively, the advertisement-block duration 112 may be set to zero when the "state.scteCueIn" state transitions from True to False, or at the end of an advertisement block.

If at step 210, the current advertisement measurement period is determined to have ended as indicated by scteCueIn set to True, a decision in block 214 is made on whether an adjustment to the ad-duration is required due to unanticipated errors such as overlapping SCTE-35 markers, or if the stream experiences delivery outages during an advertisement-block. If an error condition is detected, in block 216 the duration measuring module 112 will apply a correction to the measured advertisement-block's duration and the system transitions to step 218, which is also the transition destination when no error has been detected by block 214.

At step 218, the duration comparison module 114 may optionally compare the measured duration of the advertisement block with the expected duration of the advertisement block. The expected duration of the advertisement-blocks may be present in the playlist and extracted by the ad-marker identification module 106 and stored in the state management module 110. If a mismatch is detected by the comparison module at step 220, the method proceeds to step 222, where the duration comparison module 114 generates an alert or report. If no mismatch is detected, the method proceeds to step 224, where a report indicating normal processing is generated. Finally, at step 226 a message is communicated to other internal or external systems via the messaging component 116.

Figure 3:
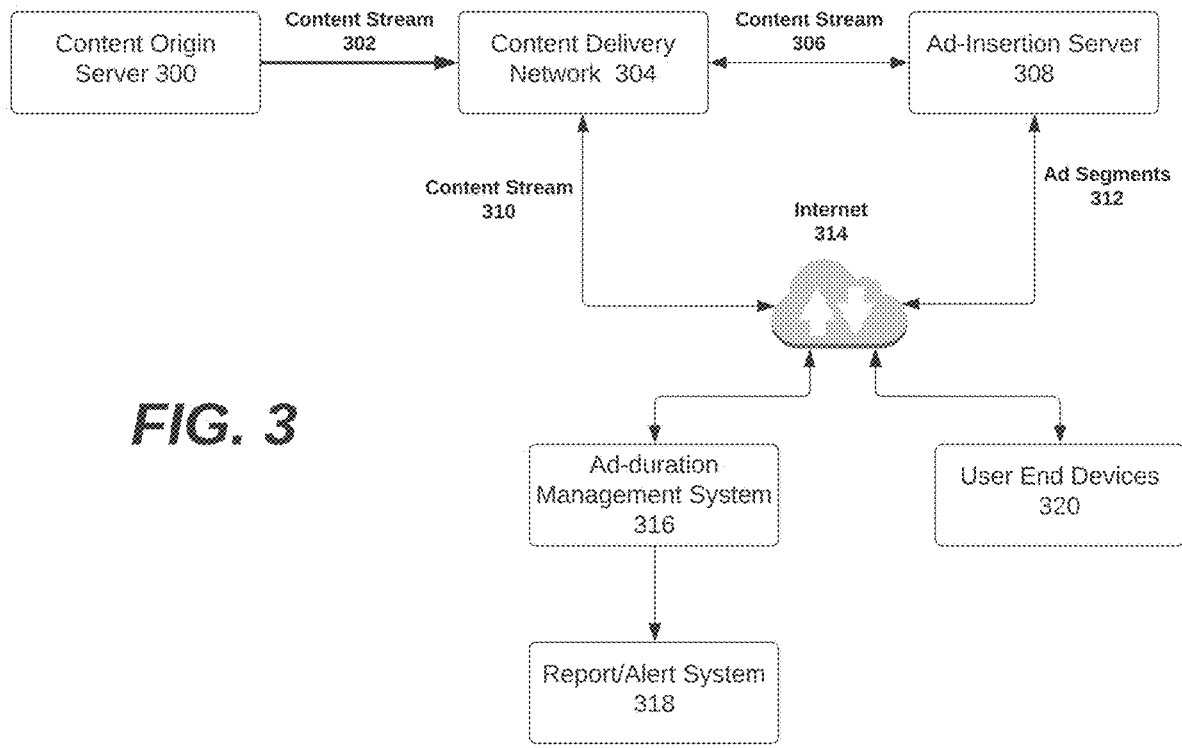

FIG. 3 provides a high-level overview of an embodiment of the ad-duration management system's network architecture.

At the left-most part of the diagram, we have a content origin server 300. This server stores the original, unmodified media files and generates initial HLS or MPEG-DASH playlists.

The content stream 302, represented by an arrow, flows from the content origin server 300, moving to the right towards the Content Delivery Network (CDN) 304. The CDN 304 caches the content from the origin server 300 and delivers it to end user devices 320 using a geographically optimized manner via the Internet 314.

From the CDN 304, we have two paths. The first path is represented by the content stream 306, leads to the ad-insertion server 308. This server manipulates the playlist to insert advertisements based on detected SCTE-35 markers. It connects with an ad-server (not shown in FIG. 3) to fetch the appropriate advertisements.

The second path from the CDN 304, depicted as the content stream 310, connects to the internet 314. The Internet 314 distributes the processed content streams 310 and the ad segments 312 to end users' devices 320, as well as the ad-duration management system 316. The management system 316 processes the playlist and performs the ad-duration measurement and comparison as described in previous sections. In case of any discrepancies or errors, this system sends notifications via the alert/report system 318. These notifications could include alerts about mismatches between expected and measured ad durations, or any other detected issues.

Through these interactions, FIG. 3 illustrates the major components and the flow of information within an embodiment of the ad-duration management system's network architecture.

Figure 4:
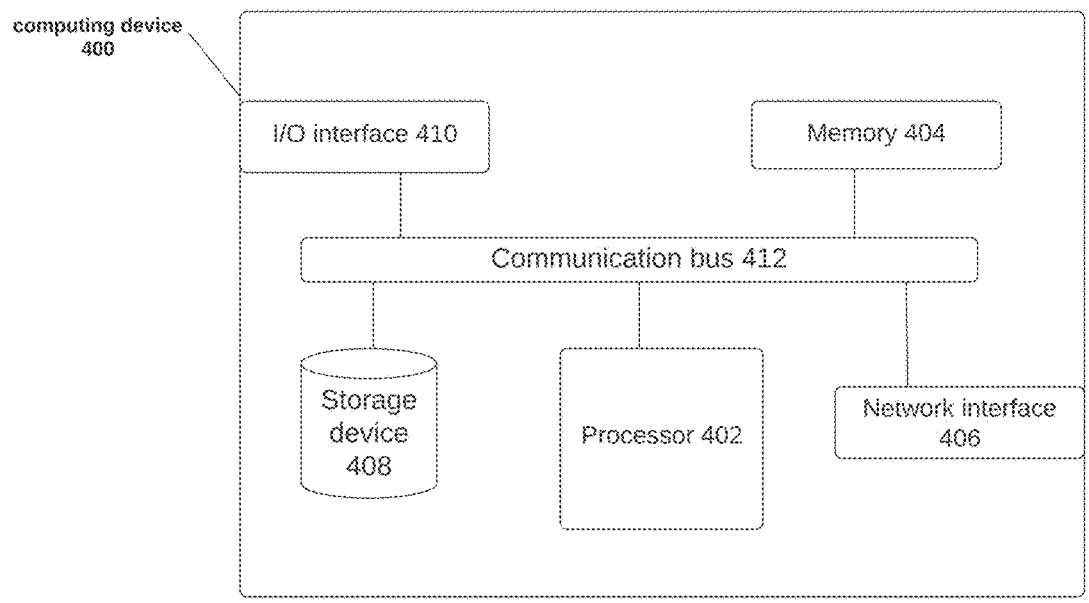

In FIG. 4, we illustrate an example of a computing device 400 suitable for implementing the ad-duration management system 100. The computing device 400 may include, but is not limited to, a server, a personal computer, a tablet, a smartphone, or any other computing device capable of executing instructions and processing data.

At its core, the computing device 400 includes a processor 402 that processes data to perform various functions, including the operations of the ad-duration management system 100. The processor 402 may include one or more processing cores and can execute instructions stored in a memory 404.

The memory 404 may include volatile and non-volatile memory, such as RAM and hard disk storage, respectively. The memory 404 stores instructions to be executed by the processor 402, including instructions for operating the ad-duration management system 100. Additionally, the memory 404 may store data, such as playlists, segment URIs, advertisement markers, and state variables, required for the operation of the ad-duration management system.

The computing device 400 also includes a network interface 406 for receiving data and sending data. The network interface 406 may be used for communicating with other devices over a network, such as the Internet. The network interface 406 can receive playlists and other data, and send messages to external systems via the messaging component of the ad-duration management system.

The computing device 400 further includes a storage device 408, which can store large amounts of data, such as historical playlists or logs of past events. This data can be used for analysis or debugging purposes.

The computing device 400 may also include an input/output (I/O) interface 410 for connecting to peripheral devices, such as a keyboard, a mouse, or a display. The I/O interface 410 can be used for user interaction, system configuration, or system monitoring.

The components of the computing device 400 are interconnected via a bus 412, which allows for communication between the processor 402, the memory 404, the interface 406, the storage device 408, and the I/O interface 410.

It should be noted that while the computing device 400 is shown with a specific configuration in FIG. 4, the invention is not limited to this configuration. The computing device 400 could include more or fewer components, and these components could be arranged in different ways. For example, the computing device 400 could include additional processors, memory modules, or interfaces, or could exclude certain components, depending on the requirements of the ad-duration management system.

Furthermore, the ad-duration management system 100 may be implemented on multiple computing devices, rather than a single device. In this case, the modules of the ad-duration management system could be distributed across the different devices, which could communicate with each other over a network. This could provide benefits such as increased processing power, redundancy, or geographical dispersion.

The ad-duration management system, therefore, provides a versatile and flexible solution for managing ad durations in media streaming environments. It can work with a variety of streaming protocols and ad markers, interface with numerous external systems, and adapt to various network conditions and user requirements. Its ability to accurately measure and compare ad durations, handle complex situations, and communicate effectively with other systems makes it a valuable tool for improving the quality and effectiveness of advertising campaigns in media streaming.

The described ad-duration management system and method provide a robust and flexible solution for managing and comparing advertisement durations in media content streams. By identifying and measuring advertisement durations and comparing them with expected durations, the system and method can help ensure the accuracy and consistency of advertisement placements in media content, thereby improving the overall quality and effectiveness of advertising campaigns. Furthermore, the state management module adds a layer of reliability to the system, ensuring proper handling of advertisement periods and various corner cases, increasing the overall robustness of the solution.

Although the foregoing text has described a particular embodiment of the ad-duration management system, it should be understood that numerous other configurations and variations are possible within the scope of this invention. For instance, the components of the ad-duration management system, such as the playlist processing module, the ad-marker identification module, or the segment URI storage module, can be realized as separate hardware components, or may be combined into fewer, more complex modules.

Similarly, while this disclosure describes a situation where a messaging component interfaces with external systems such as email servers, SMS gateways, and instant messaging platforms, it should be understood that this component could interface with any type of external system that supports message reception and transmission. This could include, for instance, automated ticketing systems, paging systems, or even proprietary communication interfaces designed for specific organizational needs.

The ad-marker identification module is described as identifying SCTE-35 markers within the playlist, but it is not limited to this type of marker. It could identify any type of ad marker used in a media content stream, such as ID3 tags in HLS streams or Event Message boxes in MPEG-DASH streams.

Further, while the specification describes storing the segment URIs and their associated information in a data structure that limits its size, there could be situations where the entire playlist is stored without size limitations. This could be necessary, for example, in cases where comprehensive analysis or archival of all segments is required.

Moreover, the components of the ad-duration management system could be distributed across multiple physical or virtual machines, for purposes such as load balancing, redundancy, or geographical dispersion.

Finally, while the specification describes an HLS or MPEG-DASH streaming scenario, it should be understood that the ad-duration management system could work with any other type of media streaming protocol, provided that the protocol supports advertisement insertion and has some means of marking the start and end of advertisement blocks.

In essence, the invention's functionality can be adapted to various scenarios and requirements, providing flexibility for future advancements in technology or changes in application needs.

The invention claimed is:

1. A system for monitoring the timing and placement of advertisements in adaptive streaming media and tracking SCTE-35 markers, the system comprising:
   a. a parsing module configured to parse a media playlist to extract segment information, including segment duration, Uniform Resource Identifier (URI), SCTE-35 cue-in and cue-out markers, and, if available, date ranges associated with each segment;
   a marker identification module configured to identify cue-in and cue-out markers based on the presence of specific SCTE-35 data indicative of such markers in the media playlist;
   c. a duration computation module configured to compute the measured duration between detected cue-in and cue-out markers by summing the durations of the segments identified by the URIs between the markers;
   d. an alert generation module configured to compare the measured duration with an expected duration and generate alerts or reports if a discrepancy is detected; and
   e. a communication module configured to transmit one or more messages detailing the detected cue-in and cue-out markers, the measured duration of the advertisement block, or any identified discrepancies or errors to an external messaging system;

wherein the system monitors adaptive streaming media, including but not limited to HLS, MPEG-DASH, and MSS streams, and tracks SCTE-35 markers to accurately determine cue-in and cue-out times.

2. The system of claim 1, wherein the parsing module is configured to process M3U8 files for HLS playlists or MPD files for MPEG-DASH playlists and is adaptable to support additional streaming formats.

3. The system of claim 1, wherein the marker identification module identifies cue-in and cue-out markers by examining specific SCTE-35 data points in the playlist information and is capable of handling new versions or specifications of the SCTE-35 standard.

4. The system of claim 1, wherein the duration computation module is also configured to identify potential mismatches between measured and expected durations, which may indicate inconsistencies in the stream or with the SCTE-35 markers.

5. The system of claim 1, wherein the communication module is designed to interface with various external messaging platforms, enhancing the system's compatibility.

6. The system of claim 1, further comprising a segment manager module configured to maintain a list of SCTE-35 segment URIs and manage the system's software and hardware resources.

7. The system of claim 1, further comprising a state management module configured to reset the duration measurement process when the same segment URI is used for multiple cue-out points and no new cue-in markers have been detected since the last detected cue-out marker within the same segment.

8. The system of claim 1, wherein the communication module employs a messaging interface capable of supporting multiple messaging protocols, thereby providing a versatile communication channel capable of interfacing with a variety of external systems.

9. The system of claim 1, further comprising an error detection module configured to identify and flag inconsistencies in the HLS or MPEG-DASH stream or SCTE-35 markers.

10. The system of claim 6, wherein the segment manager employs a caching system to optimize the system's memory usage and performance.

11. A method for monitoring adaptive streaming media and tracking SCTE-35 markers in a computing device, the method comprising:
   a. receiving and parsing a media playlist to extract segment information from individual segments, each segment information comprising a segment Uniform Resource Identifier (URI), a segment duration, SCTE-35 cue-in and cue-out markers, or date ranges;
   b. identifying and storing SCTE-35 cue-in and cue-out markers based on the SCTE-35 data extracted from the segment information;
   c. maintaining a list of SCTE-35 segment URIs based on the identified and stored markers, wherein the list of segment URIs provides necessary segment information to other components of the system and aids in managing memory and resources;
   d. initiating the measurement of an advertisement block duration upon detecting a cue-out marker, wherein the advertisement block duration comprises the cumulative duration of segments identified by the URIs occurring between a cue-out marker and a cue-in marker;
   e. comparing the measured duration of the advertisement block with an expected duration and generating an alert or a report if a discrepancy is detected;
   f. transmitting one or more messages detailing the detected cue-in and cue-out markers, the measured duration of the advertisement block, or any identified discrepancies or errors to an external generic messaging system;
   wherein the method is performed to monitor and manage ad duration in adaptive streaming media, including but not limited to HTTP Live Streaming (HLS) and Dynamic Adaptive Streaming over HTTP (MPEG-DASH), using SCTE-35 markers to accurately determine the duration of advertisement blocks.

12. The method of claim 11, wherein parsing the media playlist includes processing M3U8 files for HLS playlists or MPD files for MPEG-DASH playlists, the method being adaptable to support additional streaming formats.

13. The method of claim 11, wherein identifying SCTE-35 cue-in and cue-out markers involves examining specific SCTE-35 data points in the segment information and can handle new versions or specifications of the SCTE-35 standard.

14. The method of claim 11, wherein the duration computation module identifies potential mismatches between measured and expected durations, suggesting possible issues with the stream or SCTE-35 markers.

15. The method of claim 11, wherein the communication module is configured to transmit messages to a variety of external messaging platforms, enhancing the system's versatility.

16. The method of claim 11, wherein the segment manager module maintains a list of SCTE-35 segment URIs, managing system memory and resources.

17. The method of claim 11, wherein the duration measurement process is reset when the same segment URI is used for multiple cue-out points and no new cue-in markers have been detected since the last cue-out marker.

18. The method of claim 11, wherein the communication module employs a messaging interface capable of supporting different messaging protocols, providing a versatile means of communication.

19. The method of claim 11, further including a step of identifying and alerting any inconsistencies in the HLS or MPEG-DASH stream or SCTE-35 markers.

20. The method of claim 11, wherein the segment manager module employs a caching system to optimize memory usage and system performance.

* * * * *